July 30, 1940.   G. RABUTEAU ET AL   2,209,847
SECONDARY EMISSION DEVICE
Filed Oct. 20, 1937   2 Sheets-Sheet 2

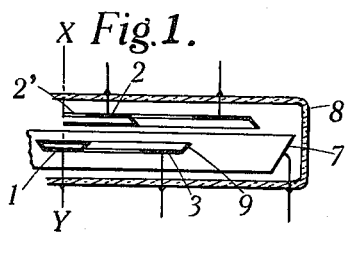
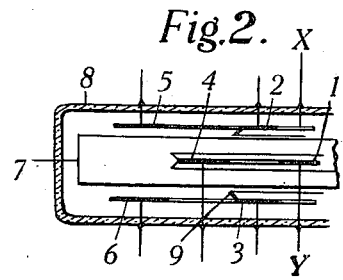
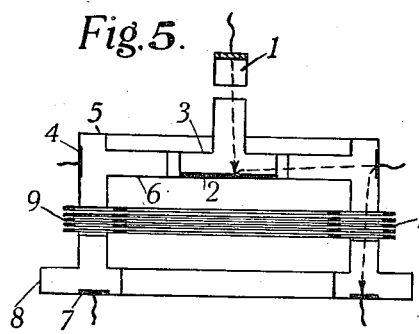
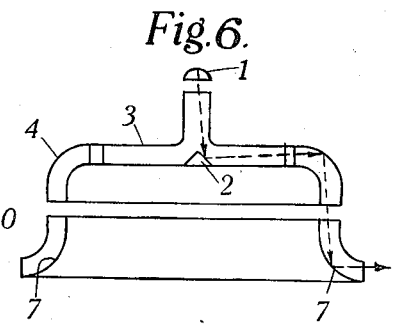
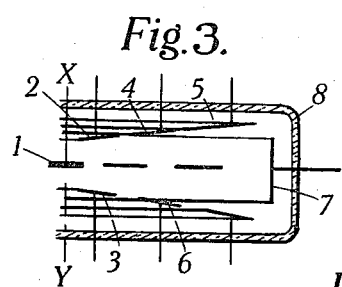
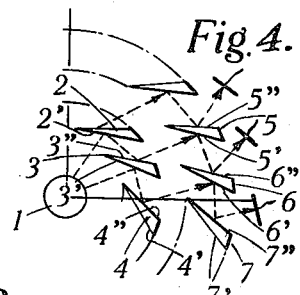
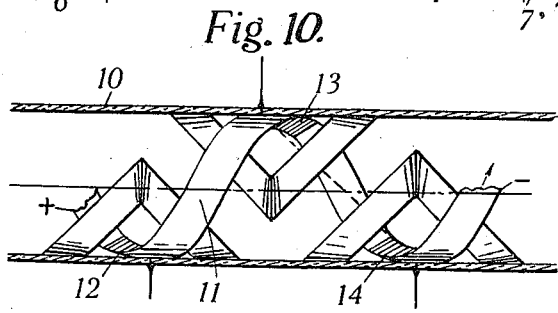

INVENTOR
G. RABUTEAU
E. LABIN
BY
*E. D. Kinney*
ATTORNEY

Patented July 30, 1940

2,209,847

UNITED STATES PATENT OFFICE 2,209,847

SECONDARY EMISSION DEVICE

Guy Rabuteau and Emile Labin, Paris, France, assignors to International Standard Electric Corporation, New York, N. Y.

Application October 20, 1937, Serial No. 169,996
In France October 24, 1936

2 Claims. (Cl. 250—175)

The present invention relates to electron discharge devices employing one or more emissions electronically or photo-electrically controlled and particularly arrangements of electrodes in such devices with a view to obtaining a better utilisation thereof.

In accordance with one aspect of the invention, electrode structures or configurations are provided in such a way that in a relatively restricted volume a large number of successive electron impacts is produced on different surfaces capable of emitting electrons under the action of incidental electronic or photo-electric bundles.

In accordance with another aspect of the invention, electrode structures or configurations are provided for employment simultaneously as electron emitting surfaces and as electronic optical elements, for example, as electronic double lenses or as accelerating lenses.

Instead of employing one only of the surfaces of an electrode as emissive surface it is possible in accordance with the features of the invention to employ all or part of the two surfaces of said electrode; an electrode so to be utilised may consist of deposits of emissive material on a suitable support of insulating material, for example, ceramic material.

In accordance with another feature, the invention also provides for electrode structures consisting of deposits of metallic or emissive substances on conducting supports.

These features and other numerous and equally important ones will appear in more detail in the following description of several embodiments illustrated in the attached drawings, in which:

Fig. 1 shows an electrode system in which each electrode is in the form of a ring;

Fig. 2 shows an electrode arrangement permitting the two surfaces of the same electrode to be utilised;

Fig. 3 shows an electrode arrangement derived from the arrangement of Fig. 2;

Fig. 4 represents an electrode arrangement in which a large number of reflections may be obtained in a relatively small volume;

Fig. 5 shows a concentric arrangement of electrodes particularly adapted to permit the control of the successive electronic emissions;

Fig. 6 shows a modified arrangement of Fig. 5;

Fig. 10 shows a tube adapted to employ, as electronic double lens, elements similar to those in Figs. 8 to 11;

Figure 7:
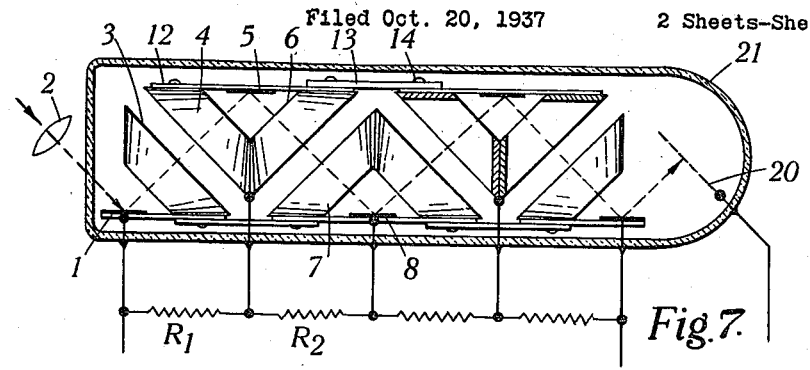
Fig. 7 shows an embodiment of an electrode structure permitting electronic double lens effects to be obtained by simple means.

In a known electrode structure, electrons emitted by a plane source energised by any suitable means are transmitted to an electrode which, under their bombardment, emits other more numerous electrons which are directed towards another electrode in which the same phenomenon is reproduced and so on, the last electrode serving as collecting electrode. This arrangement has certain drawbacks owing to the fact in particular that the quantity of energy increases very rapidly from the initial emitting electrode to the last electrode and consequently the energy dissipated in the successive electrodes rapidly increases. It becomes necessary to provide means to increase the dissipation of the heat thus generated.

It should be understood that this arrangement only with difficulty permits the introduction of electronic lenses or other acceleration or concentration devices in the path followed by the electron bundles in their journey between two electrodes. Moreover, the emission of electrons may be increased without increasing the density by increasing the surface of the electrode and it is thus desirable to increase the dimensions of the electrodes successively encountered. This increase of surface should preferably be effected in accordance with a logarithmic law since the quantity of energy to be dissipated in heat grows substantially in accordance with such a law. A structure permitting this result to be obtained is shown in Fig. 1.

In this drawing the emitting electrode 1 is in the form of a disc whose centre is placed on the axis of symmetry XY of the structure shown. The electrode 2 is composed of a flat ring whose opening 2' is centred on the axis XY and is substantially of the same diameter as the electrode 1. Other annular electrodes are disposed alternately substantially in the plane of the electrode 1 and in the plane of the electrode 2. The internal surfaces of these electrodes are covered with substance capable of emitting electrons under the action of an electronic bombardment.

The electrode 1 may be covered with a substance capable of emitting electrons either under the action of light whose source (not shown) may be arranged at the opening of the electrode 2, or under the action of an initial electronic bombardment, or again under the action of heat, means of heating (not shown) being also adapted to be provided. A last electrode which may have the form either of a flat ring or a short cylinder surrounding the structure shown serves as collecting electrode. This collecting electrode 7 is shown in the form of an inclined ring so as to receive normally the last bundle of electrons. The vitreous or ceramic envelope 8 should then be provided in the form of a short cylinder.

In Fig. 1 the two series of rings considered have been shown in two parallel planes. It is possible and often desirable to place these electrodes in different planes spaced apart sufficiently to provide between two consecutive electrodes an electronic lens system of concentration. Or it is possible, as shown in the drawing, to provide the successive rings with flanges 9 straight or curved on their external periphery, which flanges are preferably non-emissive and are effective to stop the electrons leaving the emissive surfaces at high speed with an almost grazing incidence. Such electrons are otherwise directly attracted towards the following co-planar electrode. By the provision of the flanges the number of such electrons passing over paths in a straight line from one electrode to the following co-planar electrode are greatly reduced Another alternative electrode structure employing electrodes in the form of flat rings, and in which the heat released by the successive emissions is effectively dissipated is shown in Fig. 2. Around the electrodes 1 are arranged two electrodes 2 and 3 facing each other, of the same external and internal diameter, then an annular electrode 4 is arranged in the plane of the electrode 1 and so on, the collecting electrode 7 having the form of a concentric cylinder of suitable height. The two surfaces of the electrodes 1, 4, etc. are covered with emissive substance, while the electrodes 2, 3 and 5, 6 etc. are only covered on their inwardly facing surfaces. The electrode 1 is equally illuminated on both sides by a single luminous source, the luminous intensity being distributed in suitable manner for example by means of mirrors; or two different light sources may be focussed on the electrode 1. It is clear, however, that any other method causing the plate 1 to emit electrons, for example an electronic bombardment or a sufficient heating may be employed.

In this embodiment also the various elements may be sufficiently spaced to permit the introduction of electronic lens devices or they may be provided with suitable edges as indicated in the preceding figure. These elements may also be adapted to play different parts, for example the elements 1 and 4 etc. may merely consist of reflector elements, the elements facing each being alone covered with electron emitting substance.

The arrangement shown is also capable of numerous varients, for example, the system, instead of having an axis of revolution XY, may be constructed in the form of a tubular structure. Such a structure can easily be employed as a repeater in a cable with coaxial conductors, the repeater then being included inside the sheath of the cable as well as the feed conductours for the corresponding source or sources of electrons.

It is clear that in the structures which have just been described it is possible to provide modulating or accelerating or concentrating electrodes. For example, the annular elements coplanar with the electrode 1 may be advantageously employed as accelerating electrodes by applying to them constant differences of potential. In this case the two other series of electrodes are arranged in two conical surfaces opposed at their peaks and having as axis the axis XY of the structure. This continuous variation of distance between the accelerating electrodes and the emitting electrodes ensures the continuous variation of the accelerator field which otherwise would remain fixed since the accelerating electrodes are provided with a constant difference of potential in the passage from any one of these electrodes to the next.

Various structures may also be considered starting with that shown in Fig. 3. It is possible, for example, to conceive the addition of two series of emitting electrodes arranged perpendicularly to the axis XY on each side of the structure described and offering a new channel to the electronic bundles, means being provided to reflect the electrons emitted by the last ring inclined on the first of these annular electrodes orthogonal to the axis. The disadvantage would be that the width of these additional electrodes would have to be progressively increased in order to ensure a suitable evacuation of the heat released. Or again the annular inclined electrodes might be rendered emissive on their two faces and corresponding accelerating electrodes provided, the electrons of the two channels thus formed being collected by the same cylindrical collecting electrode 7.

In Figs. 1, 2 and 3, it is further clear that a suitable electro-optical concentration system may be introduced between the last emitting electrodes and the collecting electrode.

In Fig. 4, to which we will now refer, shows in section a different electrode structure having an axial source of electrons 1. There may be associated with this source known electron director devices so as to distribute the emission of the source 1 on to the different electrodes 2, 3, 4 of triangular cross section. Other series of electrodes, such as 5, 6, 7 etc. may be arranged as shown around the preceding series of electrodes. Each of these triangular electrodes has one of its peaks inscribed on a circle centred on the source 1 and the two other peaks on another circle also centered at 1, and of larger diameter. The dimension of the electrodes of the same series and their circular arrangement is such that no electron can pass in a straight line between them and reach an electrode of the next series.

As shown in the drawings, a bundle of electrons emitted by the source or cathode 1, is reflected by the surface 2' of the electrode 2 so that the greater part of this bundle reaches the surface 3'' of the electrode 3, which is brought to a higher potential than the surface 3' of the same electrode which itself is at the common potential of the internal surfaces 2', 3', 4'. The surfaces 2'', 3'' etc. may be covered with emissive substance and the new bundles of electrons thus formed are reflected on the surfaces 5', 6' etc. of the following concentric series of electrodes and are directed to the emissive surfaces 6'', 6'' of the electrodes 6, 7, etc. A collecting electrode collects the various bundles of electrons thus obtained.

In the case in which the source 1 is composed of a filament perpendicular to the plane of the drawings, the various electrodes may be mounted on rods forming the generators of cylinders whose common axis is the filament 1. The dimensions of the electrodes can in such a structure increase very rapidly the further one gets from the axis, so that the energy dissipated increases. These electrodes may either have the form of trihedrons as shown or the form of shells permitting the electronic bundles to be concentrated. It is also possible to provide in the hollow portion of these electrodes a circulation of fluid for cooling. The plates of the electrodes mentioned above as constituting reflectors may also be arranged to emit electrons.

Other forms of electrode structures disposed around an axis may be employed, such as those shown in Figs. 5 and 6. In these figures a source of electrons 1, which may consist of an electron gun or any other suitable source, has its axis coincident with the axis of the system. The electrons emitted by the source 1 are received on a circular plate or disc 2 which can either reflect them or emit under their action new electrons. The plate or disc 2 cooperates with the element 3 to form an electronic lens device which directs the reflected or secondary electrons on to a cylindrical surface 4. This surface which may be provided with a projection 5 co-operating with the element 6, directs the electrons reflected or emitted by the cylindrical surface 4 on to another flat annular electrode 7 provided with an element 8 similar to the element 5. Between two successive reflections it is possible to provide auxiliary electrodes such as 9 or 10, which may serve for example as modulating electrodes. These auxiliary electrodes may, if desired, be in the form of rings or discs centered on the axis XY.

Fig. 6 represents an electrode arrangement similar to that of Fig. 5, but the electrode shown is rounded at the angles. Moreover, it is clear that tubular structures of other than circular section, for example polygonal section, may be employed. The axes of these electrodes may either be parallel to the axis XY or suitably inclined on this axis or may even take the form of a spiral curve with respect to the axis XY. It would also be possible to employ electrodes in the form of mesh grids for example round or polygonal.

The electronic tube device with multiple successive emissions shown in Fig. 7 provides a particularly effective concentratiton of the successive bundles and comprises a first plate covered for example with a photo-electric layer 1 illuminated by means of a luminous source concentrated by an optical system such as the lenses 2. This electrode emits electrons which are directed by the electronic double lens 3, 4 and strike against an electron emitting electrode 5. The final electron bundle arrives at a collecting electrode 20 which may be replaced by an oscillographic system. The first electrode may obviously consist of an electrode with emission electronically governed by any suitable means. Between two successive electrodes, for example between 1 and 5, and 5 and 8, are electronic double lens systems each comprising elements such as 3 and 4, and 6 and 7. These elements may be in the form of frustums of cones as shown in Fig. 7 or may be of any other suitable form, for example polygonal, as shown in Fig. 8 or with curved generators as shown in Fig. 9.

These cone frustums or similar electronic double lens are directly connected two by two, for example like the cone frustums 4 and 6 along a common generator, and are also electrically connected to the emissive plate disposed between them, for example the plate 5 for the cone frustums 4 and 6. For this purpose, conducting rods such as 12 are provided to support the structure formed by the plate 5 and the electronic double lens elements 4 and 6, thus ensuring a potential common to these three elements of the tube. These different units each of three electrodes are connected by insulating rods such as 13 fixed on the rods 12 by means of glass beads such as 14. The increasing differences of potential between these various electrode units are supplied by means of suitable connections from these units to resistances R1, R2, etc. fed by a suitable source. These potentiometric resistances are preferably arranged outside the glass sheath 21, but may be provided inside the sheath. The supporting rods 13 may themselves serve as resistance elements of an internal potentiometer. If it is desired to use the device to obtain an oscillograph image, it is possible to employ a suitable concentration lens between the last emissive electrode and the collecting electrode.

Figure 8:
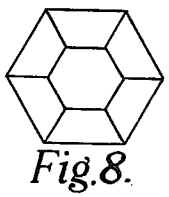
Figs. 8 and 9 show elements which may in particular be employed in the electronic double lens system of Fig. 7.
Figure 9:

Another device employing electronic lens combinations such as those shown in Figs. 7, 8 and 9 is shown in Fig. 10, in which 10 represents the glass tube, and 11 a spiral of carbon or other conducting substance of high resistance, applied against the glass tube, portions 12, 13, 14 of this spiral being covered with a metallic deposit, such as a silvering, itself covered with a layer of emitting substance such as caesium, these portions being provided on the carbon spiral around points of contact of the spiral with a plane passing through its axis. Each emitting portion such as 12 is connected by a suitable conductor, also serving as support, to two electronic double lens elements so as to form a unit similar to those employed in the arrangements shown in Fig. 7 the various successive electronic bundles being directed from one electron emitting portion to the next. A suitable difference of potential is applied between the two extremities of the carbon spiral so that a potential gradient is set up along the spiral to supply the difference of potential necessary between each emitter-double lens unit. If desired the pitch of the carbon spiral may be regularly increased from one emitting portion to the next and the surfaces covered with emitting substances regularly increased in area so as to ensure increasing differences of potential between the said emitting portions and a good dissipation of the heat generated.

The invention also provides, in accordance with certain characteristics, for electrode arrangements in which the electrodes are of cylindrical or conical shapes or have surfaces forming portions of surfaces of revolution with circular or polygonal sections and arranged coaxially. Such structures may in particular find application in repeater arrangements for coaxial conductor cables as has been indicated for the structures of Figs. 2 and 3, but they are also suitable for normal use.

Figure 11:
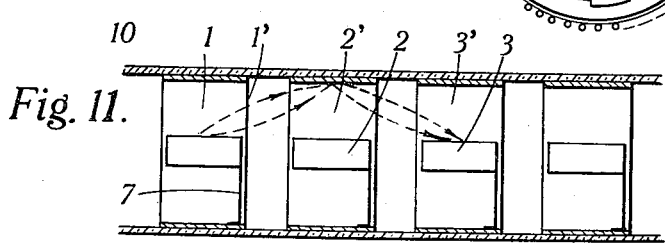
Fig. 11 shows a coaxial arrangement of cylindrical electrodes.

Figs. 11, 12, 13 and 14 represent various arrangements of such tubes. In Fig. 11 the arrangement of the electrodes alone is shown for the sake of simplicity. Couples of coaxial conductor elements are arranged one following another, the central cylinder such as 1 being fixed electrically and mechanically to the outside cylinder such as 1' by any suitable method of fixing, for example by means of fine conducting rods such as 7 symmetrically distributed with respect to the common axis of all the couples of electrodes. The potential of each couple increases regularly along the structure. The electrodes 1, 2', 3, 4' etc. are covered wholly or partially with emissive substance. When under any suitable external influence the electrode 1 emits electrons the latter are naturally deflected and directed to the electrode 2' by reason of the electronic optical system formed by the two coaxial systems 1—1' and 2—2' and by reason of the distribution of the electrical field between these electrodes. The bundle then emitted by the electrode 2' will be directed on to the electrode 3, etc. A magnetic field parallel to the axis of the structure can also be provided in order to assist the concentration and guiding of the electrons. The non-emissive concentration cylinders assist the journey of the electrons in this way, that they contribute to the fact that the electrons leave the emissive layers with a considerable inclination to the axis of the system and consequently reduce the number of electrons passing directly from the electrode 1 to the electrode 3 or beyond according to their speed.

Figure 12:
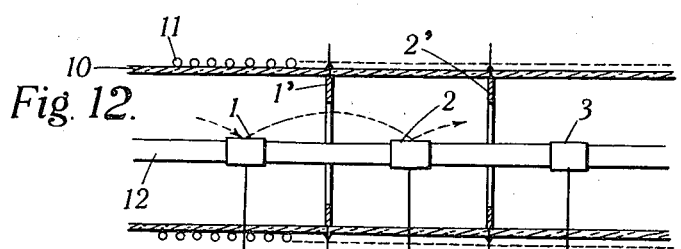
Fig. 12 shows an electrode structure derived from that of Fig. 11.

Fig. 12 shows a tube with successive multiple electronic emissions in which the sheath of glass or any other suitable substance 10 surrounded by a coil 11 giving a substantially uniform magnetic field in the direction of the axis surrounds an axial arrangement of cylindrical electrodes 1, 2, 3, etc., regularly spaced or not along a suitable support 12 which may consist of a rod of glass or other insulating substance. On these electrodes covered with emissive substance are applied regularly increasing potentials. Between two successive electrodes is arranged a plate or anodic electrode. These plates are indicated in the drawings by the references 1', 2', etc. On each of these plates is applied a potential intermediate between the potentials of the two adjacent electrodes. This potential obviously depends on the relative position of the anodic plates with respect to the emitting electrodes. The electrode 1 is such that it may be energised by the method chosen, luminous, electronic or heating. The axial magnetic field due to the coil 11 gives the electrons a helicoidal movement and effects their concentration, this concentration being facilitated by means of the ring type electrodes such as 1' because they produce the emission with oblique incidences on the axis. A collecting electrode is provided at the end of the structure.

This arrangement is capable of numerous modifications. For example, the rings 1', 2' may be replaced by cylinders not generally covering the emitting electrodes, but disposed in each case to ensure an optimum concentration of the electronic bundles. Or instead of the ring, several may be employed simultaneously.

The electron emitting electrodes may be arranged as indicated on an insulating rod or other insulating support with suitable electrical connections to each electrode or, alternatively, they may be arranged on a resisting conducting rod, for example on a carbon pencil having connections at its two ends. The resistance per unit of length may then be chosen such that the emitting electrodes which are in direct electrical connection with the carbon rod and which for example may consist of metallisations such as a silvering covered with an emissive substance such as caesium, are brought successively to regularly or irregularly increasing potentials. As has already been noted with regard to the previous drawings, these electrodes may increase in dimensions and all or merely a part of their surface may be rendered emissive.

It is also possible to employ as acceleration electrodes a resisting conducting layer deposited on the internal surface of the glass sheath or fixed thereon. This layer may moreover be replaced by a resisting helicoidal grid fixed on the sheath. In certain cases if the evacuation of the tube can be conveniently made, the resisting layer may constitute the sheath itself or may be arranged on a layer or an insulating lacquer which itself is arranged on a metal envelope, the glass envelope being eliminated, but generally the degree of vacuum required by such devices is not compatible with such a structure.

Figure 13:
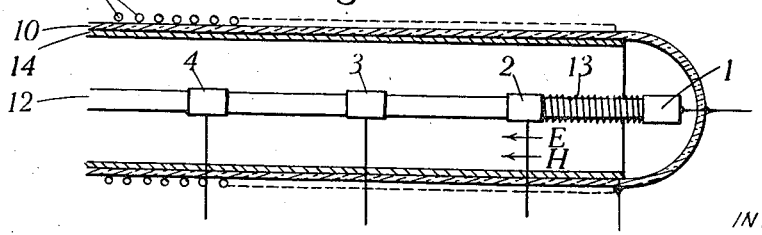

Fig. 13 shows an example of a tube with successive multiple emissions in which the concentration electrodes have been replaced by such a resisting layer 14 fixed on the inner surface of the glass envelope 10. Moreover, the axial cylindrical electrodes 1, 2, 3, have been shown mounted on a glass rod 12, a spiral 13 of a high resistance conductor being employed to ensure the electrical connection of all these electrodes and consequently their respective potentials. This spiral may also determine the respective positions of the electrodes 1, 2 and 3.

The action of concentration due to the axial magnetic field may be dimensioned by fairly simply calculations in the case of Fig. 13. If we imagine the resisting layer arranged and fed in such a manner that the equipotential surfaces are sections of the tube normal to the axis, then the electrical field E in the tube is uniform and it is represented on Fig. 14 by an arrow. In the same manner the field due to the coil 11 is uniform and parallel to the common axis represented by the arrow H. Under these conditions the equations of the trajectory of an electron leaving the first emitting cylinder at the origin of an axis Z, which coincides with the axis of the apparatus, may be obtained by the usual methods. In Cartesian co-ordinates, calling $v_r$ the radial component of the initial speed of the electron, $v_z$ its axial component and $\alpha$ the angle of the initial speed with the axis, the trajectory is defined by the following equations:

$$x = \frac{m}{eH}\left[v_r \sin\left(\frac{eH}{m}t - \alpha\right) + y'_o\right]$$

$$y = \frac{m}{eH}\left[v_r \cos\left(\frac{eH}{m}t - \alpha\right) - x'_o\right]$$

$$z = \tfrac{1}{2}\frac{e}{m}Et^2 + z'_o t$$

In which $x'_o$, $y'_o$, $z'_o$ represent the components of the initial speed and $m$, $e$ the mass and the charge of the electron.

These equations show that all the electrons leaving the origin whatever their initial direction and the radial component of their initial speed, will reach the axis at the same point at the distance $\Delta$ from the original at the end of the same time $t$, provided only that the axial component of their initial speeds be the same. The time $t$ is given by the formula:

$$t = 2\pi \frac{m}{eH}$$

and $$\Delta = \frac{2\pi m}{eH}\left[\pi \frac{E}{H} + z'_o\right]$$

By ignoring $z'_0$ which in practice is very small, we get the simplified formula:

$$\Delta = 2\pi^2 \frac{m}{e} \cdot \frac{E}{H^2}$$

The dimensions of the device will be deduced from the foregoing formulae permitting the distance between two consecutive emissive electrodes to be foreseen as well as the radius of the external cylinder. The example, supposing that between two consecutive emissive surfaces there is a difference of potential of 100 V, the distance $\Delta$ will be approximately:

$$\Delta = \frac{100}{H} \text{ cm.}$$

H being expressed in Oerstaedts.

It is also possible to conceive the utilisation of such electrode structures for the paths of multiple electron emissions in parallel, for example two or more longitudinal sections of each cylindrical electrode being adapted to be each separately covered with emissive substance and different modulations applied to the longitudinal sections of the first electrode.

Figure 14:
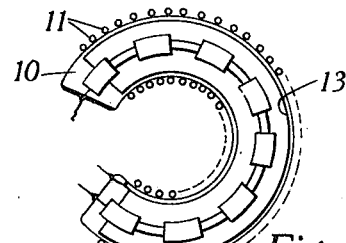
Figs. 13 and 14 show developments of tubes employing successive electron emissions.

Other devices employing co-axial electrodes may also be provided such as that shown in Fig. 14. The glass sheath 10 is of toroidal shape and on the axis of this torus is arranged a series of emitting electrodes similar to those shown in the preceding figures. A resisting layer 13 is fixed on the internal wall of the toroidal envelope and a magnetic field coil 11 may be provided around the torus. A first electrode energised by any suitable means is provided in the chain of electrodes as well as a collecting electrode adapted to co-operate with a final concentration device which is not shown. Still other combinations might be conceived, those shown and described only having been so shown and described by way of example.

The use of resisting conducting supports ensuring between the various electrodes that they carry suitable differences of potential may also be conceived in the arrangements of Figs. 1 to 3. It might, for example, be possible in Fig. 2 to employ such supports for the two extreme electrode series of the device shown.

It is clear that the embodiments shown and described in the present specification have only been given by way of example and that other configurations or structures of electron discharge devices incorporating features of the invention can also be conceived.

What is claimed is:

1. Electron discharge device comprising a source of primary electrons, secondary emissive ring electrodes of successively increasing diameter mounted in a common plane containing said electron source and surrounding said electron source and additional secondary emissive ring electrodes disposed in planes on either side of the said common plane, each of said additional ring electrodes lying over a gap between electrodes in said common plane.

2. Electron discharge device comprising a source of primary electrons, a plurality of secondary emissive co-axial annular disc electrodes of successively increasing diameter and larger than the primary electron source mounted in two parallel planes, successively larger discs being disposed in alternate planes and adapted to receive electrons from the next smaller disc and to transmit electrons to the next larger disc, flanges on said discs for preventing direct passage of electrons between co-planar discs, and a circular receiving electrode beyond the largest of said discs.

GUY RABUTEAU.
EMILE LABIN.